(12) United States Patent
Whitaker

(10) Patent No.: US 8,046,514 B2
(45) Date of Patent: Oct. 25, 2011

(54) BROADCASTING DATA ACROSS A BUS IN WHICH DATA TRANSMISSION CAN BE DELAYED IF A SNOOPING DEVICE IS NOT READY TO RECEIVE

(75) Inventor: Martin Whitaker, High Wycombe (GB)

(73) Assignee: Aspex Technology Limited, Buckinghamshire (GB)

( * ) Notice: Subject to any disclaimer, the term of this patent is extended or adjusted under 35 U.S.C. 154(b) by 1215 days.

(21) Appl. No.: 10/432,309

(22) PCT Filed: Nov. 21, 2001

(86) PCT No.: PCT/GB01/05138
§ 371 (c)(1), (2), (4) Date: Oct. 29, 2003

(87) PCT Pub. No.: WO02/42917
PCT Pub. Date: May 3, 2002

(65) Prior Publication Data
US 2004/0220948 A1 Nov. 4, 2004

(30) Foreign Application Priority Data
Nov. 21, 2000 (GB) .................................. 0028353.1

(51) Int. Cl.
*G06F 13/372* (2006.01)
*G06F 13/00* (2006.01)
(52) U.S. Cl. ........................... 710/124; 710/32; 710/107
(58) Field of Classification Search .................. 710/124, 710/32, 59, 60, 107; 707/100
See application file for complete search history.

(56) References Cited

U.S. PATENT DOCUMENTS

| 4,620,278 | A | * | 10/1986 | Ellsworth et al. | 710/119 |
|---|---|---|---|---|---|
| 4,692,895 | A | * | 9/1987 | Huffman | 710/59 |
| 5,507,002 | A | | 4/1996 | Heil | |
| 5,572,703 | A | * | 11/1996 | MacWilliams et al. | 711/146 |
| 5,634,138 | A | * | 5/1997 | Ananthan et al. | 710/21 |
| 5,790,831 | A | * | 8/1998 | Lin et al. | 710/315 |
| 5,802,577 | A | * | 9/1998 | Bhat et al. | 711/146 |
| 5,940,600 | A | * | 8/1999 | Staats et al. | 710/107 |
| 5,953,538 | A | * | 9/1999 | Duncan et al. | 710/22 |
| 5,983,024 | A | * | 11/1999 | Fye | 710/36 |

(Continued)

FOREIGN PATENT DOCUMENTS
EP 0 924 623 A2 6/1999
(Continued)

OTHER PUBLICATIONS

Microsoft Computer Dictionary, Fifth Edition, Microsoft Corporation, 2002, pp. 141 and 512.*

(Continued)

*Primary Examiner* — Faisal M Zaman
(74) *Attorney, Agent, or Firm* — Dinsmore & Shohl LLP

(57) ABSTRACT

A system and method of broadcasting data to multiple targets across a system bus, such as the peripheral component interconnect (PCI) bus, that does not normally support broadcast transfers, in which one target responds to the bus transaction and the remaining targets listen in on the bus transaction to receive data from the system bus. The responding target stalls the bus transaction when any of the listening targets communicate to the responding target that they are temporarily unable to accept the data on the bus.

20 Claims, 2 Drawing Sheets

U.S. PATENT DOCUMENTS

Figure 1:
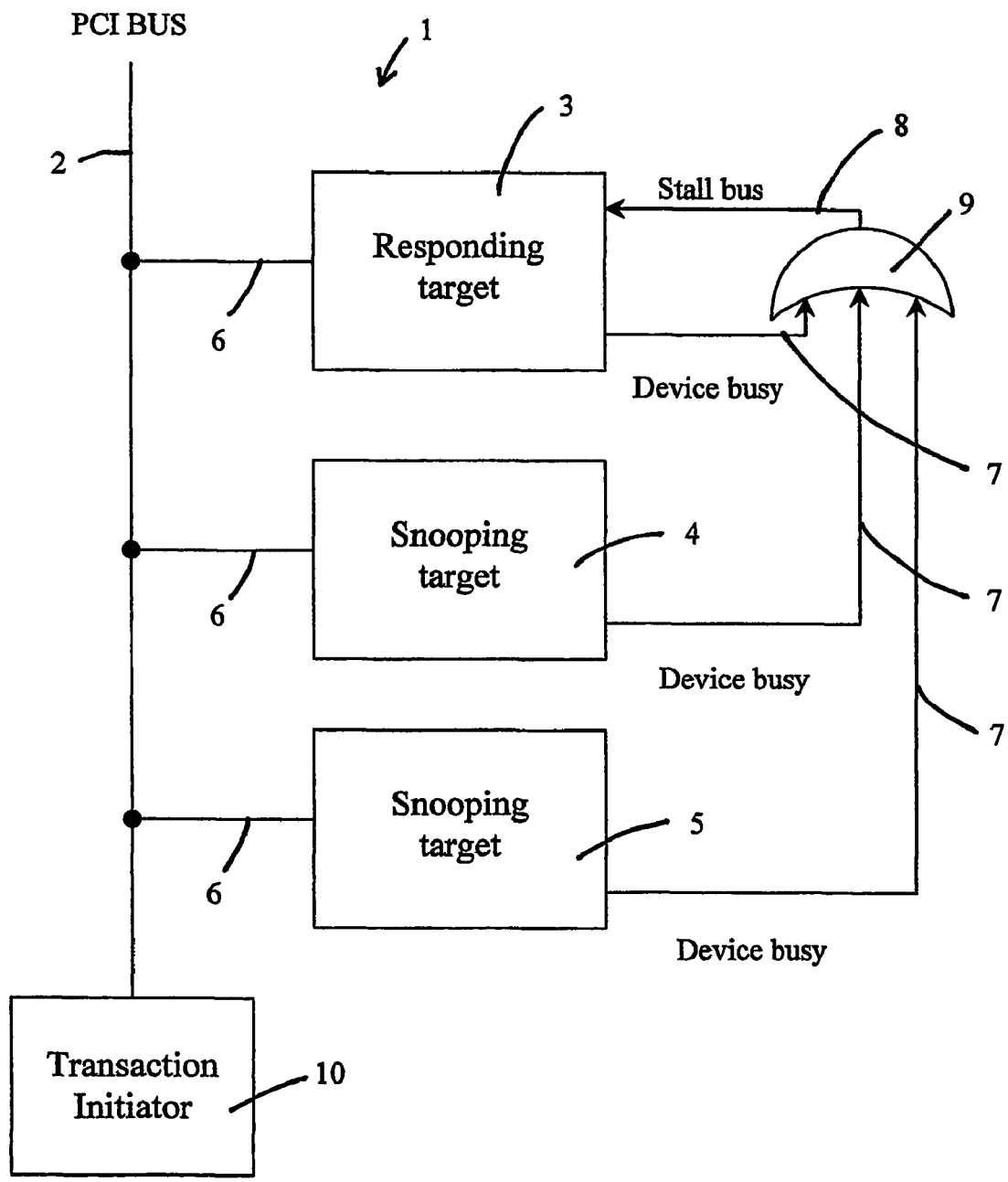

| | | | | |
|---|---|---|---|---|
| 6,058,436 A * | 5/2000 | Kosco | | 710/11 |
| 6,061,794 A * | 5/2000 | Angelo et al. | | 726/3 |
| 6,157,397 A * | 12/2000 | Bogin et al. | | 345/538 |
| 6,175,889 B1 * | 1/2001 | Olarig | | 710/309 |
| 6,230,225 B1 | 5/2001 | Olarig et al. | | |
| 6,336,169 B1 * | 1/2002 | Arimilli et al. | | 711/144 |
| 6,356,260 B1 * | 3/2002 | Montalbo | | 345/204 |
| 6,397,279 B1 * | 5/2002 | Jaramillo et al. | | 710/110 |
| 6,433,785 B1 * | 8/2002 | Garcia et al. | | 345/531 |
| 6,678,770 B1 * | 1/2004 | Sutoh | | 710/110 |
| 6,694,390 B1 * | 2/2004 | Bogin et al. | | 710/53 |
| 7,587,542 B2 * | 9/2009 | Riley et al. | | 710/113 |
| 7,809,873 B2 * | 10/2010 | Perry et al. | | 710/110 |
| 2003/0074497 A1 * | 4/2003 | Hirabayashi et al. | | 710/33 |

FOREIGN PATENT DOCUMENTS

| | | | | |
|---|---|---|---|---|
| JP | 03219345 A | * | 9/1991 | |
| JP | 05046476 A | * | 2/1993 | |
| JP | 06259395 A | * | 9/1994 | |
| WO | WO 9932976 A1 | * | 7/1999 | |
| WO | WO 2007099614 A1 | * | 9/2007 | |

OTHER PUBLICATIONS

Stone, Harold S., "Microcomputer Interfacing", Feb. 1983, Addisson-Wesley Publishing Company, Inc., pp. 88-89.*

"NN961193: Method of Implementing Nap Mode in a PowerPC Multiprocessing System", Nov. 1, 1996, IBM, IBM Technical Disclosure Bulletin, Nov. 1996, vol. 39, Iss. 11, pp. 93-94.*

Poletti, F.; Poggiali, A.; Bertozzi, D.; Benini, L.; Marchal, P.; Loghi, M.; Poncino, M.; , "Energy-Efficient Multiprocessor Systems-on-Chip for Embedded Computing: Exploring Programming Models and Their Architectural Support," Computers, IEEE Transactions on , vol. 56, No. 5, pp. 606-621, May 2007.*

Pfile, R.W.; Wood, D.A.; Reinhardt, S.K.; , "Decoupled Hardware Support for Distributed Shared Memory," Computer Architecture, 1996 23rd Annual International Symposium on , pp. 34, May 22-24, 1996.*

Shi, W.; Lee, H.-H.S.; Ghosh, M.; Lu, C.; , "Architectural support for high speed protection of memory integrity and confidentiality in multiprocessor systems," Parallel Architecture and Compilation Techniques, 2004. PACT 2004. Proceedings. 13th International Conference on , pp. 123-134, Sep. 29-Oct. 3, 2004.*

* cited by examiner

BROADCASTING DATA ACROSS A BUS IN WHICH DATA TRANSMISSION CAN BE DELAYED IF A SNOOPING DEVICE IS NOT READY TO RECEIVE

CROSS REFERENCE TO RELATED APPLICATIONS

This application is a PCT National Phase of International Application No. PCT/GB01/05138 filed Nov. 21, 2001.

This invention relates generally to the transfer of data across a bus within an electronic system, and more specifically to a method of broadcasting data to multiple targets on a bus, such as the peripheral component interconnect (PCI) bus, that does not normally support broadcast transfers.

Modern electronic systems make use of connecting many components to a central bus, commonly known as a databus, so that data can be efficiently moved between components such as the processor, memory and peripherals. At their conception, databases were envisaged as being used to move data between one transaction initiator and one responding target at a time. Initially, with computerised systems consisting of only one processing unit and few peripheral components, this proved to be an adequate solution to the problem of allowing the processing unit and peripheral components to transfer data and communicate.

With the advent of modern electronic components running at much higher speeds than when the original specifications for many databuses were drawn up, and the development of many more types of components able to connect to these databuses, the efficient use of the limited transmission bandwidth along databuses is essential in achieving good overall system performance in computerised systems. Examples of high-performance plug-in components which are compatible with the PCI databus standard include video capture cards, Double Data Rate (DDR) memory technologies, IEEE 1394 communication cards, cable and XDSL modems and LAN cards based on optical or Fast Ethernet protocols. Equally compatible are surface mounted components present on motherboards and daughterboards of computer systems. Many of these types of PCI databus compatible components require heavy bandwidth usage.

A common limiting factor for overall system performance of computerised systems are bottlenecks caused when databus bandwidth is not enough to accommodate all the data that needs transporting simultaneously. For example, when large amounts of information are frequently transferred to and from memory, the memory databus bandwidth can quickly become saturated leading to a cap on performance. This problem is exacerbated in high performance computer systems, particularly within systems that contain more than one processing unit wherein a transaction initiator may be transmitting data to one or more responding targets simultaneously.

In these situations data broadcasting (i.e. the simultaneous transfer of data from a single source location to multiple destinations) is often required. If the system databuses used in these high-performance systems do not support broadcast transfers then the data has to be individually and sequentially transferred to each of the required responding targets, unnecessarily consuming bus bandwidth and increasing both the time taken and the number of processor cycles needed to complete the task. These are detrimental factors to the performance of the system and need to be minimised.

Unfortunately, many of the standard databases used within computerised systems do not support broadcast data transfers. Some of these databuses do provide a simple message broadcasting scheme, but this has been found in practice to be an impractical method for transferring large blocks of data. For example, the databus most commonly and widely used in computerised systems is the PCI bus, and the specification for this databus provides for a 'Special Cycle' transaction which allows a message to be broadcast to all components on the bus, but this message can only consist of a single data item, with no associated addressing information. An example of when a 'Special Cycle' transaction may be used is in sending power management directives to all the components on the bus. This type of transaction transmits very low bandwidth information and does not allow burst transfers, hence it is unsuitable for transmitting usable data blocks in real-time applications. Also, because no handshaking is performed on this transaction, there is no way to stall the data transaction if a target is temporarily unable to accept the data, for example, if the receiving data buffer is full.

The only other way in which the PCI databus specification allows more than one component to listen in on data not being directly transmitted to that component is via 'VGA palette snooping'. This is a means of having a passive listener on the PCI bus listen in, or 'snoop', on the data being transmitted across the PCI bus and is used when special VGA video display cards and other high-end display-related components, such as MPEG decoder cards, need to be able to look at the video card's VGA palette to determine what colours are currently in use. This feature is only rarely used and is also unsuitable for transmitting large blocks of data to multiple components at speed as only a restrictive address range (only of interest to display-related components) is passed along. Again, no handshaking is present in "VGA palette snooping" and a further drawback is present in that an assumption is made that the passive listener is always at least as fast as the intended responding target in being able to receive the transmitted data, otherwise the passive listener may miss some information.

In many cases the length of the circuit path between a transaction initiator and the intended multiple responding targets are different, perhaps the data having to pass through bridges and other connectors before reaching certain responding targets, and this can cause timing delays between different responding targets receiving the same broadcast data. The broadcasting system has to be flexible enough to accommodate any lags in the responding targets receiving data by varying or even pausing the data transmission.

Examples of prior art that relates to PCI bus broadcasting transactions are provided by U.S. Pat. Nos. 5,507,002, 5,634,138, 5,983,024 and 6,230,225.

U.S. Pat. No. 5,507,002 to AT&T Global Information Solutions Company describes a method of allowing sideband signalling to be made available to standard PCI compliant components, and also describes part of the PCI specification relating to "Special Cycle" transactions, and describes the limitations of using this type of transaction.

U.S. Pat. No. 5,634,138 to Emulex Corporation concerns a method of burst broadcasting data from a transaction initiator to multiple responding targets over a PCI bus, but the teaching in this specification is to modify both the transaction initiator and the responding target which can be costly and impractical. This method requires extra PCI bus transactions to be performed to initiate and terminate broadcast operations, and responding targets cannot respond that they are not ready to accept data.

U.S. Pat. No. 5,983,024 to Honeywell, Inc. relates to a method of robust data broadcasting on a PCI bus and it requires that both the transaction initiator and the responding targets are hardware-modified in accordance with the teachings of the specification. The responding targets have no way of signaling to the transaction initiator that they are not ready to accept data, and this method only works if the snooping targets are capable of accepting the data transacted across the PCI bus at whatever speed the transaction initiator and intended responding target are communicating at.

U.S. Pat. No. 6,230,225 to Compaq Computer Corp. teaches how broadcasting can be achieved with components connected to a PCI bus through the introduction of a separate multicast bus dedicated to informing components of when to listen in on PCI bus transactions. This method requires changes to the hardware of all components and the introduction of a separate dedicated multicast bus. In addition, only the intended responding target can signal that it is not ready for receiving data.

From the prior art it is demonstrated that for a databus broadcasting system to work effectively there must be provided a way for the responding target or snooping targets, to be able to at least suspend or even slow down or force resends on any of the data transactions being carried out on the databus. It is also evident that any system which requires significant changes to be made to existing hardware in order to be implemented will not be readily adopted when there is such a large existing user base of unmodified components.

It is with a view to solving these problems that there is provided a method of broadcasting data to multiple targets across a system bus, such as the peripheral component interconnect (PCI) bus, that does not normally support broadcast transfers, in which one target responds to the bus transaction and the remaining targets listen in on the bus transaction to receive data from the system bus, the method comprising the responding target stalling the bus transaction when any of the listening targets communicate to the responding target that they are temporarily unable to accept the data on the bus.

The present invention allows use of the existing handshaking communications established between the transaction initiator and the responding target to signal stall bus commands from any one or more of the snooping targets or the responding target itself. As a consequence, the integrity of the data received by every target on the PCI bus is not compromised through a target not being ready to receive the data transmitted through the PCI bus. The benefit of using existing standard hardware specifications to provide the conduit for signaling is that robust data broadcasting according to the present invention can be carried out cheaply and quickly, as no modifications to the PCI bus connectors or associated and supporting components, except for the targets themselves, are needed.

Put in another way, what is proposed is a method of broadcasting data to multiple targets across a data bus, such as the peripheral component interconnect (PCI) bus, that does not normally support broadcast transfers, in which one target responds to the bus transaction and another target snoops on the bus transaction, the method comprising the snooping target transmitting a device busy signal to the responding target when it is temporarily unable to snoop on the data carried by the data bus and the responding target responding to the device busy signal by stalling the data transfer on the data bus.

Preferably, the transmitting step comprises any one of a plurality of snooping targets generating and transmitting a device busy signal to the responding target for stalling the data bus.

In a further preferred feature the method comprises the step of Oring together all of the signals from the plurality of snooping targets to provide a single bus stall trigger signal. This provides a simple low-cost way of logically combining all of the device busy signals into a single bus stall trigger signal which only requires a single logic gate.

In order to react to the responding target or any of the snooping targets not being able to receive data, the method preferably further comprises the responding target generating a temporary device busy signal and using the same to trigger stalling of the data bus.

So that this method may be adopted with minimal changes to the existing hardware and software in use already, it is advantageous that the method as previously described comprises any of the snooping targets communicating with the responding target via an unused control channel of the data bus. This again advantageously minimises cost and complication as existing connections between the target and snooping targets are used.

Once the responding target and/or snooping targets are able to receive data again, it is advantageous that the method comprises a responding step that stalls the system bus until such time as the device busy signal is negated.

In an alternative aspect, the invention also resides in a data transfer apparatus for broadcasting data to multiple targets across a system bus, such as the peripheral component interconnect (PCI) bus, that does not normally support broadcast transfers, the apparatus comprising a responding target connected to the system bus for responding to a data transfer and at least one snooping target connected to the system bus for listening in on data transfers on the system bus, and processing means provided at the responding target for receiving device busy signals from the at least one snooping target, the processing means being arranged to stall the system bus in response to receipt of a device busy signal.

Phrased differently, the invention could also be said to be a method of broadcasting data simultaneously from a transaction initiator to a responding target and to at least one other target across a databus, the method comprising: snooping on the data being transmitted across the databus by the one other target; generating a busy signal if the one other target is unable to receive the data being transmitted across the databus; and the transaction initiator responding to the generation of a busy signal by stalling the transmission of data across the databus until the busy signal is removed.

The present invention can also be considered to be a system for broadcasting data comprising a transaction initiator, a responding target and at least one other target all on the same databus wherein: the transaction initiator is arranged to broadcast data across the databus and the at least one other target comprises means for snooping on the data; each of the at least one other target comprises means for generating a busy signal if the target is unable to receive the data being sent from the traction initiator; and the transaction initiator comprises means for responding to the generation of a busy signal by stalling the transmission of data across the databus until the busy signal is cleared.

In a preferred feature, the transaction initiator further comprises means to vary the data transmission rate across the databus down to zero. By being able to vary the speed of the data transmission to at least one speed between the maximum or normal speed and zero, any target that falls behind in processing data received from the data bus may have a chance to catch up without having to totally halt the transmission process and causing further delay.

It is also envisaged that for such a system it is advantageous to allow for the data receiving rate to be different for each target so that robust data broadcasting according to the present invention may be implemented with systems containing PCI bus compatible targets of differing specifications, allowing for maximum design flexibility.

Figure 2:
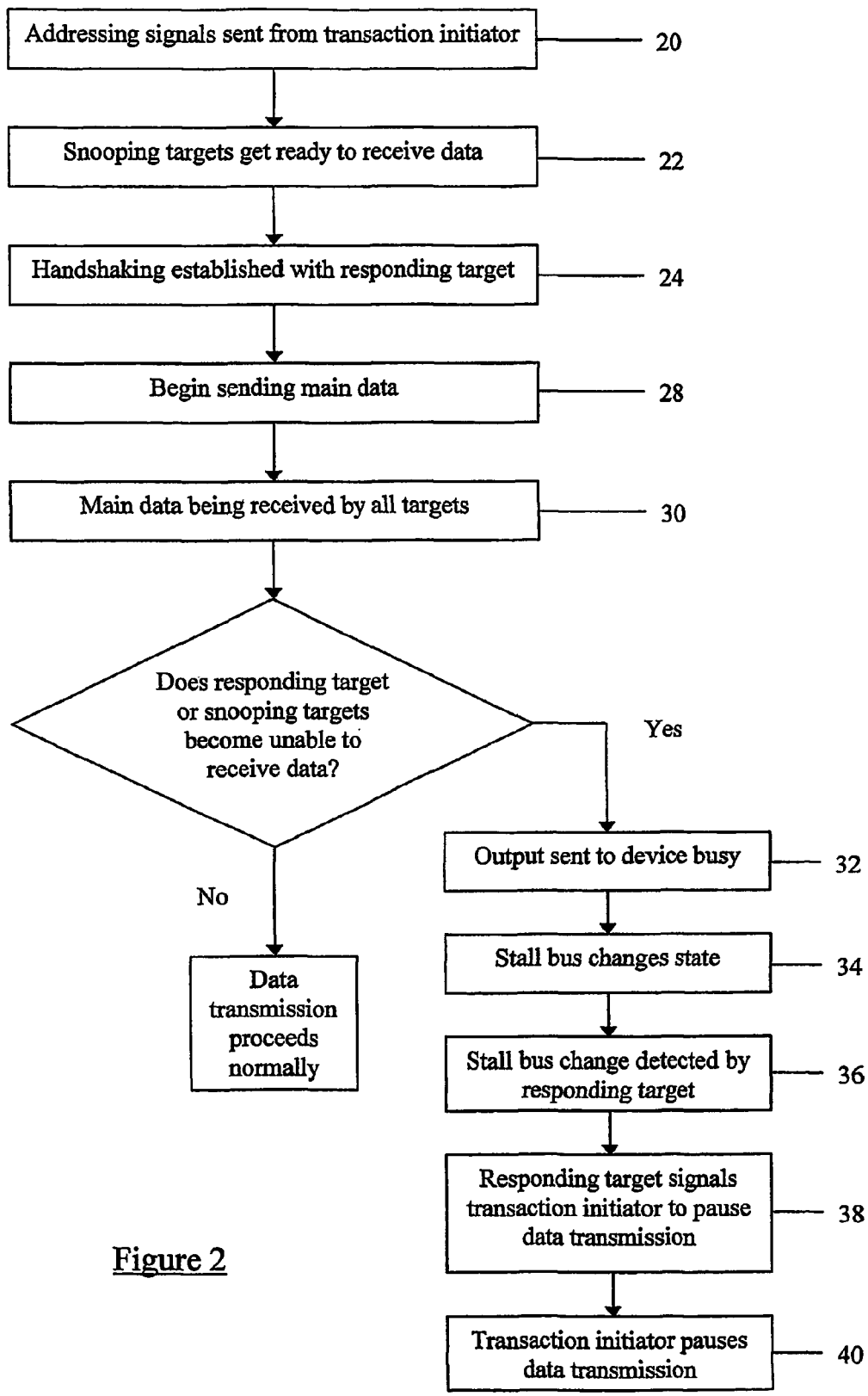

The present invention is now described with reference to the accompanying figures wherein:

FIG. 1 is a block and circuit diagram of a communications apparatus embodying the present invention; and FIG. 2 is a flow diagram showing the steps implied in implementing a method of broadcasting data using the apparatus of FIG. 1 according to the embodiment of the present invention.

In FIG. 1 there is illustrated a functional block and circuit diagram of a communications apparatus, shown generally at 1, for effecting broadcast of data across a databus. In this embodiment a databus complying with the PCI specification is represented at 2, although this system is equally applicable to any databus suitable for use in computerised systems. Data signals are sent along the bus 2 from a transaction initiator 10 addressed to an intended responding target 3, the responding target being in the form of a plug-in PCI board. Also connected to the same bus 2 are other snooping targets 4 and 5, both also in the form of further PCI plug-in boards. Two snooping targets are shown in FIG. 1 although the number of snooping targets may be as many as required. The responding target and each snooping target are connected to the PCI bus through standard PCI plug-in board connectors 6, although this method is equally applicable to components connected to the PCI bus through traces on a circuit board. For example, surface mounted components may be connected to the PCI bus in this method whilst still complying with the inventive concept.

Provided with the responding target are two connectors, one for connecting a DEVICE BUSY line 7 and one for connecting a STALL BUS line 8. Each snooping target also possesses a connector for connecting a DEVICE BUSY line 7. Each DEVICE BUSY line 7 feeds from the responding and snooping targets into a logical OR gate 9, and the output of logical OR gate 9 feeds into the STALL BUS connector on the responding target through STALL BUS line 8.

Referring now to FIG. 2, a method of using the above-described communications apparatus is now described. When data is to be transmitted across the PCI bus 2, before the main data itself is sent at step 20, there is first sent addressing data which signals the responding target 3 to be ready to accept the following main data. At the same time, every other snooping target 4, 5 also responds at step 22 by getting ready to accept the following data as well. When handshaking has been established at step 24 between the responding target 3 and the transaction initiator 10, the main data is then transmitted at step 28 and is received at step 30 by the responding target and all the snooping targets.

At any time during transmission of the main data should any one or more of the responding 3 or snooping 4, 5 targets not be able at step 30 to receive data at the rate at which it is being sent, an output is sent at step 32 along the DEVICE BUSY line 7 of the responding 3 or snooping target 4, 5 which has the problem, and this causes the STALL BUS line 8 state to change at step 34 due to the logical OR gate 9 receiving an input. On detecting at step 36 the change in the status of the STALL BUS line, the responding target 3 signals at step 38 to the transaction initiator 10 to pause the data transmission until all of the responding and snooping target(s) which have difficulties are able to continue receiving data again. The responding target 3 signals the transaction initiator 10 through the normal control lines of the PCI bus 2, and because of this, there is no need to modify the transaction initiator 10 either in terms of hardware or software, nor is there any need to modify the BIOS settings of the main board upon which the PCI bus 2 is situated. On receipt of the signal from the responding target 3, the transaction initiator 10 stalls at step 40 the PCI bus 2.

In this embodiment, the STALL BUS signal prompts a pause in the data transmission, but it is envisaged in alternative embodiments (not shown) that the data transmission may also be re-sent or slowed down according to different types of signals sent from the responding target One way in which these alternative embodiments may be put into effect is to have separate outputs on the responding and snooping targets, similar to the DEVICE BUSY outputs, for indicating that the responding or snooping target requires data to be re-sent or the transmission rate to be slowed down. This can be achieved using components and techniques that are well known to the skilled addressee. The responding target 3 would then pass on the required type of signal to the transaction initiator 10, which would then act accordingly to re-send or slow down the data transmission.

In FIG. 1 the STALL BUS line 8 and DEVICE BUSY line 7 are both separate hardware components on the PCI plug-in boards. An alternative embodiment (not shown) uses unused pins (to unused lines of the PCI bus) in the PCI bus connector specification to act as the STALL BUS line and the DEVICE BUSY line, thus minimising the changes needed to implement the present invention on existing systems.

The embodiment of FIG. 1 shows one responding target and one STALL BUS line. In a further alternative embodiment (not shown), any or all of the snooping targets may also act as a responding target. In this case, all of the snooping targets 4 shown in FIG. 1 are provided with their own STALL BUS line inputs from the logical OR gate, so that should they in turn be the responding target they will also be able to signal to the transaction initiator to pause, re-send or slow down the data transmission.

Of course, in any one data transaction along the PCI databus 2 there is only one responding target and if the responding target is different to the previous responding target, the previous responding target may change to being a snooping target.

In a yet further embodiment (not shown), any one out of the responding or snooping targets may become the transaction initiator, responding to signals to pause, re-send or slow the data transmission from the other responding or snooping targets. The PCI bus specification also allows the same component to act as both the transaction initiator as well as a responding target at the same time.

It will be understood that various modifications may be made without departing from the spirit and scope of the invention. For example, although the present invention has been illustrated in the context of a PCI bus, the same concept works with any bus that lacks a dedicated burst broadcast mode but does permit two-way communication between the transaction initiator and at least one responding target. Accordingly, it is to be understood that the invention is not to be limited to the specific illustrated embodiment, but only by the scope of the appended claims.

The invention claimed is:

1. A method of broadcasting data to multiple devices across a system bus that does not normally support broadcast transfers, the method comprising:
    establishing handshaking between a first device on the system bus and a second device on the system bus;
    transmitting data over the system bus from the first device to the second device, in response to handshaking being established;
    receiving the data at the second device and at one or more other devices on the system bus;
    determining, by the one or more other devices, that the one or more other devices are unable to continue receiving the data at the rate at which the data is being transmitted;

receiving, by the second device, an indication of the determination;

transmitting a signal over the system bus from the second device to the first device, in response to receiving the indication; and stalling, by the first device, the transmission of the data over the system bus in response to the first device receiving the signal, wherein handshaking remains established between the first device and the second device during the stalling of the transmission.

2. The method of claim 1, wherein the indication is received by the second device from a single bus stall line.

3. The method of claim 2, wherein the single bus stall line is on a channel of the data bus not used to transmit the data.

4. The method of claim 3, further comprising:
generating, by the one or more other devices, one or more device busy signals, in response to the determination;
receiving the one or more device busy signals at a logical OR gate;
utilizing the OR gate to generate the indication; and
transmitting the indication from the logical OR gate to the second device over the bus stall line.

5. The method of claim 4, further comprising:
generating, by the second device, a device busy signal, if the second device is unable to continue receiving the data at the rate at which the data is being transmitted; and
transmitting the device busy signal from the second device to the logical OR gate.

6. The method of claim 1, wherein the system bus is a peripheral component interconnect (PCI) bus.

7. The method of claim 1, further comprising:
re-transmitting the data over the system bus from the first device to the one or more other devices, in response to the first device receiving the signal.

8. The method of claim 1, further comprising:
detecting, by the first device, the removal of the signal; and
resuming transmission of the data over the system bus from the first device to the second device, in response to the detection.

9. A system for broadcasting data to multiple devices across a system bus comprising:
a first device that transmits data to a second device over a common data line after establishing handshaking with the second device;
one or more other devices that also receive the data from the common data line, wherein the one or more other devices provide an indication to the second device that the one or more other devices are unable to continue receiving the data at the rate at which the data is being transmitted;
wherein the second device transmits a signal to the first device over the common data line, in response to receiving the indication;
wherein the first device stalls the transmission of the data, in response to receiving the signal; and
wherein handshaking remains established between the first device and the second device during the stalling of the transmission.

10. The system of claim 9, further comprising a bus stall line that differs from the common data line, and wherein the indication is received by the second device from the bus stall line.

11. The system of claim 10, further comprising:
one or more device busy lines that differ from the common data line and the bus stall line; wherein the one or more other devices generate one or more device busy signals for the one or more device busy lines; and wherein the indication is transmitted on the bus stall line if the one or more device busy signals are present on the one or more device busy lines.

12. The system of claim 11, further comprising:
a logical OR gate connected to the one or more device busy lines and outputs the indication on the bus stall line if the one or more device busy signals are present on the one or more device busy lines.

13. The system of claim 12, wherein the common data line, the one or more device busy lines, and the bus stall line are part of a peripheral component interconnect (PCI) bus.

14. The system of claim 9, wherein the first device re-transmits the data over the common data line, in response to receiving the signal.

15. The system of claim 9, wherein the first device detects the removal of the signal and resumes transmission of the data over the system bus from the first device to the second device, in response to the detection.

16. The system of claim 9, wherein the one or more other devices do not transmit data on the common data line while handshaking is established between the first device and the second device.

17. The system of claim 9, wherein the one or more device busy lines and the bus stall line are lines that are unused lines per the PCI bus connector specification.

18. A system for broadcasting data to multiple devices across a system bus comprising:
a first device that transmits data to a second device over a common data line after establishing handshaking with the second device;
one or more other devices that also receive the data from the common data line and do not transmit data on the common data line while handshaking is established between the first device and the second device;
one or more device busy lines connected to the one or more other devices that differ from the common data line;
a logical OR gate connected to the one or more device busy lines; and
a bus stall line that connects the logical OR gate and the second device;
wherein at least one of the one or more other devices transmits a device busy signal to the OR gate over at least one of the device busy lines, if the at least one device is unable to continue receiving the data at the rate at which the data is being transmitted;
wherein the logical OR gate receives the one or more device busy lines and outputs an indication on the bus stall line if the device busy signal is present on the one or more device busy lines;
wherein the second device transmits a signal to the first device over the common data line, in response to receiving the stall signal;
wherein the first device stalls the transmission of the data, in response to receiving the signal; and
wherein handshaking remains established between the first device and the second device during the stalling of the transmission.

19. The system of claim 18, wherein the one or more other devices do not transmit data on the common data line while handshaking is established between the first device and the second device.

20. The system of claim 18, wherein the second device is connected to one of the device busy lines, and wherein the second device transmits a device busy signal to the logical OR gate over the device busy line if the second device is unable to continue receiving the data at the rate at which the data is being transmitted.

* * * * *

UNITED STATES PATENT AND TRADEMARK OFFICE
CERTIFICATE OF CORRECTION

| | | |
|---|---|---|
| PATENT NO. | : 8,046,514 B2 | Page 1 of 1 |
| APPLICATION NO. | : 10/432309 | |
| DATED | : October 25, 2011 | |
| INVENTOR(S) | : Martin Whitaker | |

It is certified that error appears in the above-identified patent and that said Letters Patent is hereby corrected as shown below:

On the Title page,

Item (87) PCT Pub. Date: "May 3, 2002" should read --May 30, 2002--.

Signed and Sealed this
Seventeenth Day of July, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,046,514 B2 | Page 1 of 1 |
| APPLICATION NO. | : 10/432309 | |
| DATED | : October 25, 2011 | |
| INVENTOR(S) | : Whitaker | |

It is certified that error appears in the above-identified patent and that said Letters Patent is hereby corrected as shown below:

In Column 1, Line 20, delete "databases" and insert -- databuses --, therefor.

In Column 1, Line 37, delete "XDSL" and insert -- xDSL --, therefor.

In Column 4, Line 48, delete "traction" and insert -- transaction --, therefor.

Signed and Sealed this

Thirteenth Day of November, 2012

David J. Kappos
*Director of the United States Patent and Trademark Office*